Jan. 1, 1963  F. K. FLOYD  3,071,018
MECHANICAL DRIVE MECHANISM
Filed June 5, 1961  3 Sheets-Sheet 1
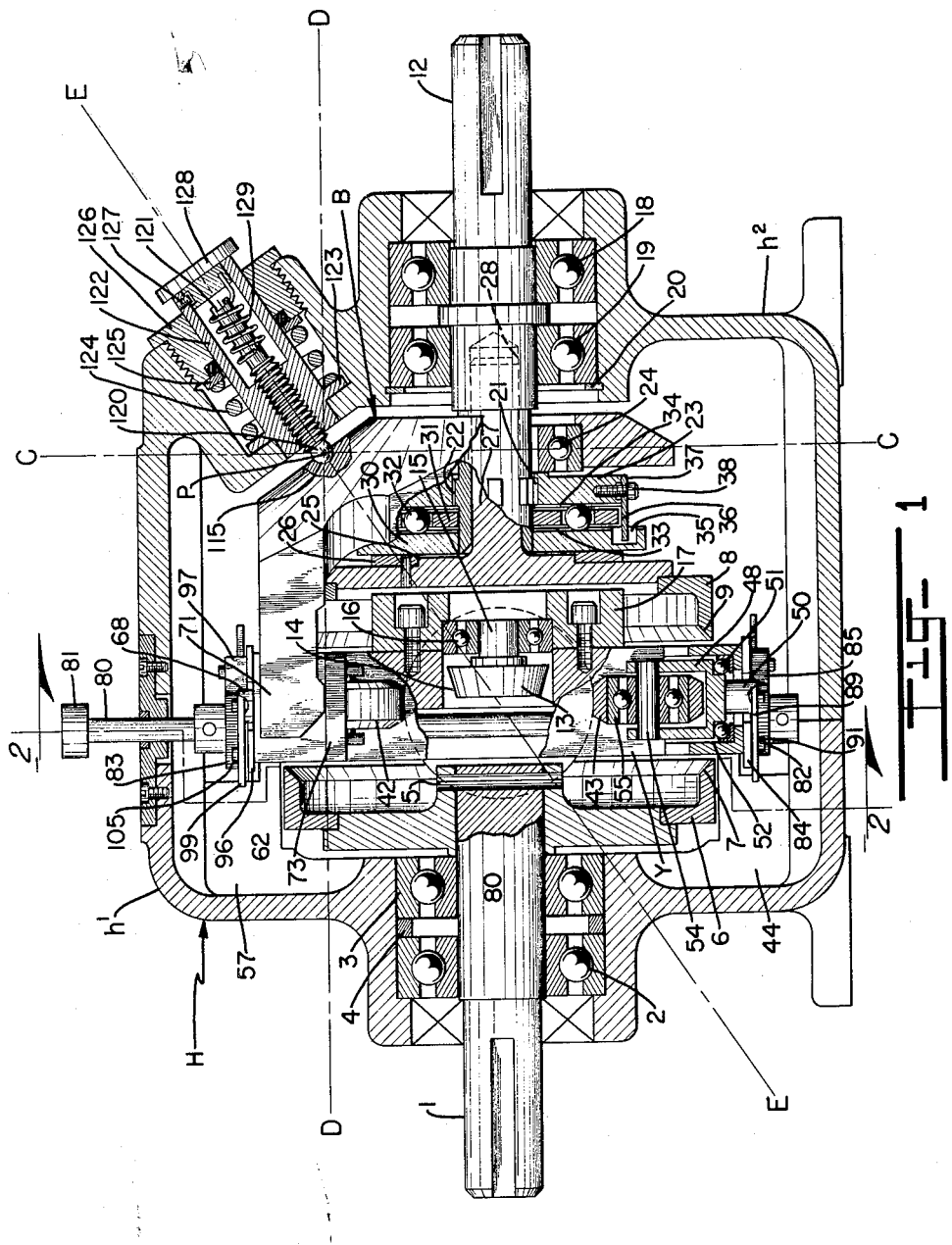
INVENTOR.
FREDERICK K. FLOYD
BY
ATTORNEY Jan. 1, 1963　　　　　F. K. FLOYD　　　　　3,071,018
MECHANICAL DRIVE MECHANISM
Filed June 5, 1961　　　　　　　　　　　　　　3 Sheets-Sheet 2
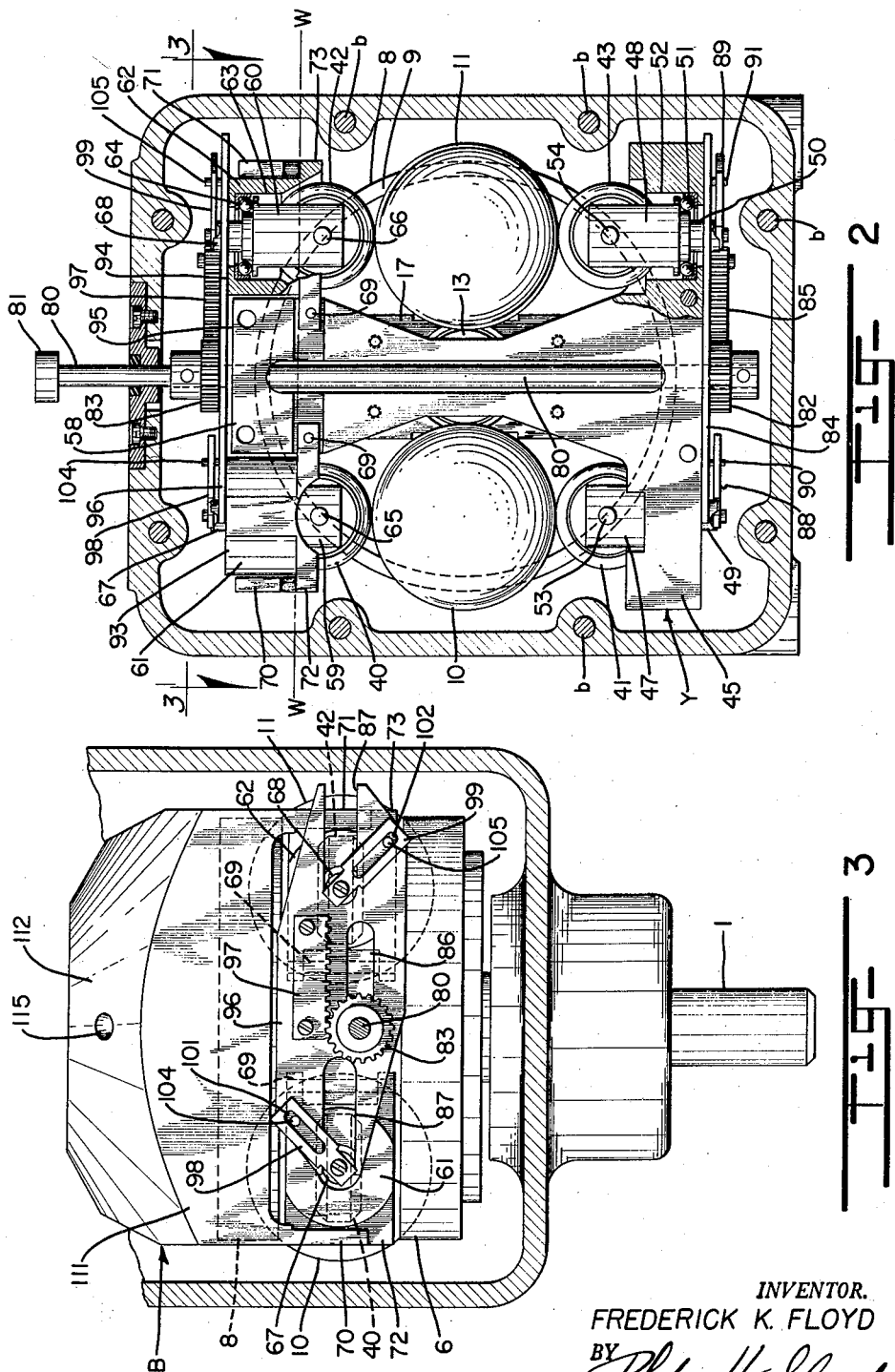
INVENTOR.
FREDERICK K. FLOYD
BY
*Philip H. Sheridan*
ATTORNEY

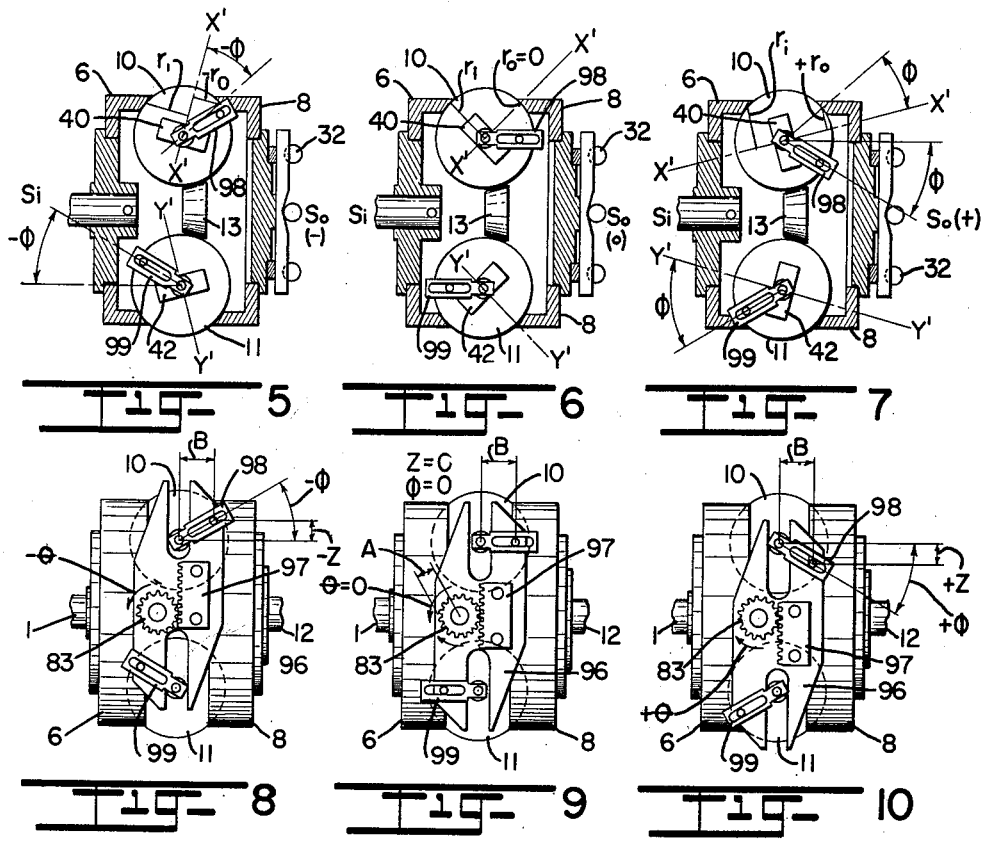
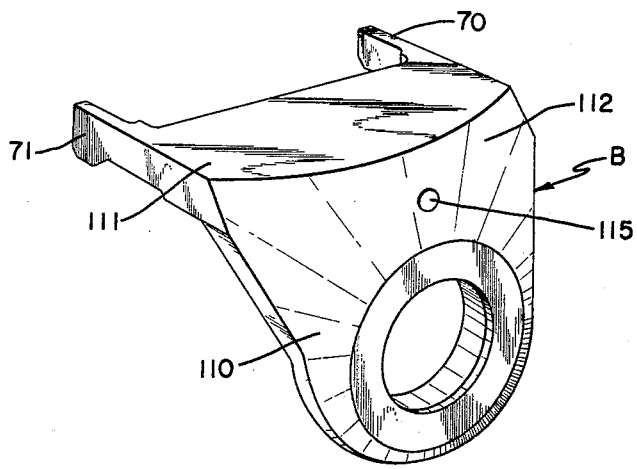

United States Patent Office 3,071,018
Patented Jan. 1, 1963

1

3,071,018
MECHANICAL DRIVE MECHANISM
Frederick K. Floyd, 2050 S. Madison St.,
Denver 10, Colo.
Filed June 5, 1961, Ser. No. 114,753
20 Claims. (Cl. 74—198)

The present invention relates to a self-contained mechanical power transmission apparatus and particularly to a drive mechanism that functions primarily as an infinitely variable speed drive and as a positioning device with inherent functions of a clutch, a brake and a torque limiter. Among its proposed uses are (1) industrial application such as process control, materials handling, work positioning, machine tool and welding feeds; (2) data handling application such as micro film drives, a magnetic and punch tape scanning and index scanning; (3) military application such as radar antenna, servomechanisms, sequence programing, fuel pumps, gun and camera mounts and trajectory tracking; and (4) instrument and computer application such as in chart drives, test programing, analog computers and mechanical integration.

It is thus the primary object of this invention to provide an improved drive mechanism that will function as outlined and one that has the stated possible uses.

Another object is to provide a mechanism of the type described with balls as the power transmitting means wherein reverse speeds and zero speed are available without reversing or stopping the input and without the use of gears or a differential mechanism.

Yet a further object is to provide drive apparatus which is composed of a minimum of parts, which is relatively inexpensive to construct and in which the mechanism to control speed requires very little energy and is inherently linear with respect to output speed.

A most important object of this invention is the provision in mechanism of the type described of a common central support roller which permits the separation of the functions of support and control of the balls in order to obtain optimum friction contact loading and control performance.

Still another object is to provide a unit of the type mentioned wherein there is inherent linear speed control without the use of compensating means.

It is an object to provide drive mechanism wherein the contact forces needed to produce the required friction tractive effort is proportional to the torque being transmitted, such a unit having a built in overload protection mechanism.

Another object is to provide apparatus of the type described that has the same speed torque characteristic for both directions of torque and for all output speeds and wherein maximum torque is available at output speeds including zero.

Still another object is to provide in a multiple ball type friction drive having balls internally located and positioned with respect to driving and driven members the fewest number of balls whereby the latter may be, for a given housing size, quite large thereby deriving a minimum value of contact stress at the friction contacts for a given value of transmitted torque and housing size.

A further objective is to provide, in a ball type friction drive, an internal rotational creep action between

2 the output shaft and the associated internal driven member so that at zero output speed under torque load said internal driven member is not damaged by the balls spinning thereon at fixed points.

An object is to provide in apparatus of the type described a simple take-up mechanism which automatically takes up any existing or subsequently developed play in the torque transmitting system, all without introducing torsional spring effect in the output shaft.

A very important object and advantage of the unit is its extremely wide speed range, the latter being located in the most commonly needed range, namely, between motor speed or numerically greater in either direction and zero speed without the use of gearing or differential mechanisms.

In brief, the drive mechanism includes input and output shafts coupled to generally internal annular surfaces frictionally bearing on at least a pair of spherical balls disposed about a central axis, means to support the balls from moving radially inwardly and circumferentially about the central axis, means to apply pressure variable depending upon output torque between said surfaces and the balls whereby motion is transmitted from the driving to the driven surfaces and thus from the input to the output shaft, and means to vary the axes of rotation of the balls.

Other objects and advantages of this invention will become apparent by referring to the drawings wherein schematic illustrations are provided as well as the illustrated preferred embodiment, wherein throughout the drawings like numerals represent similar elements and wherein:

FIGURE 1 is a sectional view along the longitudinal axis of the preferred embodiment of this invention;

FIGURE 2 is a sectional view taken along the lines 2—2 of FIGURE 1;

FIGURE 3 is a view taken along the lines 3—3 of FIGURE 2;

FIGURE 4 is a perspective view illustrating one of the elements of FIGURE 1; and FIGURES 5–10 inclusive are schematic views showing different positions of the control rollers and adjustable means for adjusting the axes of the control rollers.

In order to fully understand the preferred embodiment and the theory of the operation thereof, reference will be made to the schematic illustrations in FIGURES 5–10 but first the structural components of the preferred embodiment will be explained. Considering at the outset FIGURES 1–4 inclusive, numeral 1 represents an input shaft suitably journaled in bearings 2 and 3 maintained in spaced relationship by spacer 4 and said input shaft is keyed through suitable means 5 with a cup-shaped member or disk 6 having an annular conical surface 7. As should be apparent by the sectional views of FIGURES 1 and 2, H generally represents a housing or frame or supporting enclosure capable of division for ease of repair and assembly through bolt means $b$ into sections $h^1$ and $h^2$. Axially opposite cup 6 is a similar cup-shaped member or disk 8 also having an annular conical surface 9 in axial alignment with and facing the conical surface 7, but adequately spaced therefrom to receive therebetween a pair of spherical balls 10 and 11. Numeral 12 represents the output shaft and, as will be explained, power is transmitted from shaft 1 through the cone cup 6 keyed thereto to the balls 10 and 11 and the latter in turn are caused to rotate on controlled axes. These balls 10 and 11 are arranged as shown to contact surfaces 7 and 9 and the power is transmitted and delivered to the output shaft 12. The latter is accomplished by the following, although it will have to be assumed for the moment that the balls 10 and 11 are properly positioned, located and maintained between surfaces 7 and 9 to engage same frictionally and as part of this positioning, there is shown in FIGURE 1 a support roller 13 also having a conical annular surface 14 and this support roller through its extending shaft 15 is journaled for free rotation by support within bearing 16 mounted in an extension block 17 of a supporting yoke Y.

The output shaft 12 is similarly journaled for rotation on spaced bearings 18 and 19 maintained in position by means including snap ring 20 and is keyed internally at 21 to the circular annular cam member 23. Loosely surrounding shaft 12 between ring 20 and key area 21 there is provided an annular thrust bearing means 24 that carries an annular-like portion of a right angled bracket B shown perspectively in FIGURE 4 and to be more completely described hereinafter. The rear of cone cup 8 is provided with a shoulder 25 for accommodating a friction ring 26 and it will be noted cup 8 has an extending shaft or hub 27 received within cylindrical recess 28 of shaft 12. Bearing against ring 26 is an annular cam 30 and located between the cams 23 and 30 is an annular carrying member 31 for carrying and supporting a desired number of balls 32. The mating surfaces of cams 23 and 30 are provided with indented V-shaped areas represented at 33 and 34 and, as shown although such is by no means necessary, these V-shaped areas are spaced 90 degrees apart. Contained within these areas 33 and 34 are portions of the balls 32 and assuming the parts are properly positioned, an axial force proportional to output torque is created by the action of the cams 23 and 30 which causes the balls 32 to roll up the inclined surfaces of areas 33 and 34. This latter action urges cup 8 leftward, when viewing the drawing of FIGURE 1, against the spherical balls 10 and 11. Specifically, conical surface 9 is urged to the left and this in turn urges the balls 10 and 11 towards surface 7 to provide the normal force required to obtain tractive force between the balls 10 and 11 and the surfaces 7 and 9. As stated, it will have to be assumed that support roller 13 and what will later be referred to as controlled rollers are properly positioned relative to the balls to also maintain this tractive force. It should be clear that common support roller 13 functions to prevent the balls 10 and 11 from moving radially inwardly independent of the pressure or angular position of the control rollers hereinafter mentioned. It might be mentioned that the slope of areas 33 and 34 of cams 23 and 30 is such that there is always more than sufficient force at the tractive contacts to prevent slippage for all conditions of output torque. The common central support roller 13 being free of all control function may have any desired angle to its surface 14 as long as it exerts a generally outward supporting action on the balls 10 and 11.

In the preferred embodiment the angle is shown to be a cone of such an angle to exert sufficiently greater force on the input cup 6 than the output cup 8 to compensate for the added contact force required to supply the losses within the drive system. The latter has the added advantage that, at all output speeds up to a speed substantially greater than input speed in reverse direction, the axes of rotation of the balls 10 and 11 does not pass through the point of contact with the support roller 13.

It will be noted that cam 30 has adjacent its periphery and on its outer surface facing cam 23 a small slot 35 within which extends a pin-like protrusion 36 carried by element 37 integral with cam 23 and secured to cam 23 by means 38. The purpose of this latter structure and ring 26 is to provide a limiting overload protection mechanism consisting of friction ring 26 interposed between the cup 8 and cam 30, pin 36, and the circumferential extremities of slot 35 which define a stop. As the output torque on shaft 12 is increased, cams 23 and 30 rotate with respect to each other and this in turn increases the forces at all tractive contacts on the balls 10 and 11 so that no slippage at these points can occur as long as cams 23 and 30 have free play. Also, no slippage can occur at friction ring 26 since here too the axial force mentioned is always more than sufficient to prevent slippage for all normal conditions of output torque. If, however, the output torque is increased toward overload proportions in either direction, then pin 36 will contact stop 35 and further increase in the developed force at the friction contacts and the friction ring is prevented. Then, as the output torque is still further increased, which would be an overload situation, something will slip since additional contact force is not produced. Slippage occurs at the overload friction ring 26 rather than at the tractive contacts on the balls 10 and 11 because the ring 26 is proportioned to slip at a lower value of torque for a given axial force in the system. Thus, destructive slippage at the contact points on balls 10 and 11 is prevented and the design of contact on the friction ring 26 is such as to take full rated horsepower for a substantial period of time under stall conditions without damage. Furthermore, this also prevents the excessive contact forces, which due to the action of the cams 23 and 30 would otherwise damage the contact surfaces and bearing races under heavy overloaded conditions.

An important part of this invention resides in having a pair of control rollers 40 and 41 for the ball 10 and a similar pair of control rollers 42 and 43 for the ball 11. These control rollers, being separate and independent of the common support roller, can be and are in the preferred version, located in position with respect to the balls to provide the linear control function described hereinafter. Obviously, these control rollers function with the elements previously described to maintain the required tractive forces but they also provide the very important means for varying the output speed by changing the axis of rotation of the balls 10 and 11. Numeral 44 of FIGURE 1 represents a portion of housing section H, and specifically an interior extension thereof, to which is connected integrally the yoke generally represented at Y, said yoke having a lower solid portion 45 from which extends upwardly a pair of spaced rotatable gimbals 48 and 47. These gimbals are journaled and supported on bearings positioned in recesses in portion 45 with each gimbal having an extension passing beneath portion 45. Each such extension is depicted at 49 and 50 and one of said bearings and recesses is illustrated respectively at 51 and 52. Each gimbal is bifurcated as shown to receive therebetween and support in journaled relationship the control rollers 41 and 43, the support being pins 53 and 54 respectively and bearing means 55 as illustrated in FIGURE 1 with respect to roller 43. The yoke member Y also has a top portion that is integral with housing H, this top portion being connotated by numeral 58 and it too suspends in journaled relationship gimbals 59 and 60, with control rollers 40 and 42 being respectively supported therein in journaled relationship.

Pivotally mounted at 69 to portion 58 are the gimbal mounts or movable members 61 and 62, each having recesses, one being shown at 63, for receiving and supporting in journaled relationship, such as on bearings 64, gimbals 59 and 60. Here again each gimbal is bifurcated to receive therebetween in journaled relationship the rollers 40 and 42, the support being pins 65 and 66 respectively and bearing means, not shown, comparable to that at 55. Also each gimbal 59 and 60 has an extension 67 and 68 respectively passing above the gimbal mounts, the latter generally being in transverse alignment to portion 58 but capable of being pivoted about parallel, coplanar axes formed by the pivot points 69. Thus, the gimbal mounts, rollers 40 and 42 and associated parts, while tending to remain in transverse alignment as shown in FIGURE 2, are capable of being positioned to locate the rollers 40 and 42 in a position closer to rollers 41 and 43 respectively. This latter possible arcuate movement of the rollers 40 and 42 is for aiding in maintaining the tractive force and the means for accomplishing same will hereinafter be described in more detail, is being pointed out at this time, however, that said means, referring to FIGURE 2, includes the forks 70 and 71 of bracket B exerting a downward force respectively on flanges 72 and 73 of the gimbal mounts 61 and 62.

As will become apparent, each pair, including their axes, of control rollers 40, 41 and 42, 43 and by pair reference is made to those associated with each ball 10 and 11, remain parallel throughout their adjusted relationship but the axes of the upper rollers 40 and 42 may be varied conjugately with respect to each other, as may the axes of both lower rollers 41 and 43. As stated, the purpose of the control rollers is to maintain sufficient contact to insure proper tractive force when all of the ball contacts are combined and secondly, and more important, the control rollers may be adjusted to vary the axis of rotation of the spherical balls 10 and 11.

Now as to varying the axes of the rollers 40 to 43, reference is again made to FIGURES 1, 2 and 3, and particularly the latter two figures. Extending centrally through the yoke Y and suspended journaled therein is an elongated shaft member 80 that at one end thereof has enlarged means 81 permitting manual or automatic rotation of shaft 80 and adjacent each end there is keyed to the shaft 80 pinions 82 and 83. At the bottom of portion 45 there is mounted for transverse sliding movement relative to said portion a plate 84 which carries integrally therewith a rack member 85 having teeth engageable with the gear 82, the amount of movement being limited by the confines of a slot, comparable to 86 in FIGURE 3, in plate 84 which moves relative to shaft 80 as the latter is manually rotated. Plate 84 is also provided with open slots, comparable to 87 in FIGURE 3, through which extend respectively the extensions 49 and 50, the latter having keyed thereto respectively levers 88 and 89 that respectively are slotted to receive therethrough pins 90 and 91 that depend from plate 84. This whole action forms linkage whereby when gear 82 is rotated, the plate 84 is moved a corresponding amount and this in turn rotates the axes of rotation of rollers 41 and 43 conjugately. The identical sort of an arrangement exists at portion 58, inasmuch as the provided upstanding portions of the mounts 61 and 62 have top surfaces 93 and 94 which are substantially flush with yoke portion 95 above which is mounted for transverse sliding movement plate 96, said plate having a rack 97 that is adapted through the lever means 98 and 99 in cooperation with the slots 86 and 87 in plate 96, the slots 101 and 102 in levers 98 and 99 respectively, the latter slots receiving pins 104 and 105 respectively upstanding from plate 96, and the extensions 67 and 68 that extend from gimbals 59 and 60, to cause conjugate movement of rollers 40 and 42 upon rotating gear 83 of the rollers 40 and 42. The control plates 96 and 84 are thus moved in unison transversely by means of the structure just described and as the control shaft 80 is moved through angle theta hereinafter mentioned, the axes of rollers 40 and 41 remain parallel and the axes of rollers 42 and 43 remain parallel during roller movement with the axes of rollers 40 and 42 and rollers 41 and 43 moving conjugately, all of which causes the axes of rotation of the balls 10 and 11 to vary in the manner required to provide cooperative tractive effort of the two balls at all speed settings.

FIGURES 5 to 10 schematically illustrate how the output speed of shaft 12 is controlled by rotation of control shaft 80 to obtain infinitely variable speeds, even greater than input speeds, in both forward and reverse directions, zero speed and how the output speed is directly proportional to the angle of rotation of the control shaft 80. Bearing in mind that the balls 10 and 11 rotate on axes X'—X' and Y'—Y', then due to the control rollers 40 to 43 the following theoretics apply and this can be understood by referring to the markings on FIGURES 5–10:

Balls rotate on axes X'—X' and Y'—Y' due to control rollers $$\frac{S_o}{S_i}=\frac{r_i}{r_o}=\tan\phi$$

in FIGS. 5 to 7. Thus $$S_o = S_i \tan\phi$$

$$\tan\phi = \frac{Z}{B}$$

in FIGS. 8 to 10. Thus $$S_o = S_i \frac{Z}{B}$$

But $Z = 2\pi A\theta$ in FIGS. 8 to 10. Thus $$S_o = S_i 2\pi \frac{A}{B}\theta$$

Therefore output speed is directly proportional to angle of rotation of the control shaft 80. It will be noted that in FIGURE 6 where $\theta$ and $\phi = 0$ the axis of rotation of the balls passes through their point of contact on the cup 8. In this condition the balls are spinning at fixed points on the balls and the output cup and if the output shaft is torque loaded thereby developing high control force, this represents an adverse wear and seizure situation from the standpoint of heat dissipation and inaccessibility of lubricant. This condition is prevented by the combination of a relatively soft and porous slip ring 26 and a suitable lubricity additive in the lubricant which results in a low speed creep viscous action at the slip face whenever there is appreciable torque being transmitted through it to the output shaft. Such results in the output cup 8 rotating even though the output speed is zero so that lubricant and a cool surface is constantly being presented to the points of contact. Since the control rollers, bearing against the balls substantially at point contacts, and their axes are rotated substantially about their point contacts, no gross sliding motion during changes of speed setting exists and therefore small energy is required to change the speed control setting. As explained, zero output speed is obtainable by the proper setting of the speed control shaft 80. This zero speed setting is slightly different for different values of output torque, due to the creep action of the slip ring 28 and tractive ball contacts with cups 6 and 8. The output shaft may be made to come to rest at different angular positions by jogging the control shaft 80 from the proper zero setting to cause momentary rotation of the output shaft in either direction, thereby serving as a positioning device.

In order for the control rollers to control the axis of rotation of the balls 10 and 11 in the presence of transmitted output torque, these rollers must exert a restricting tractive force on the balls in a direction parallel to their axes. This tractive force is developed through friction by a vertical force exerted by bracket member B. As previously explained, the bracket B has one leg 110 of conical configuration and is right angled in general shape and includes a substantially horizontal leg 111 provided with spaced bifurcations 70 and 71 which rest on the pivotally mounted gimbal mounts 61 and 62. The bracket B is mounted on thrust bearing 24 around the shaft 12 as explained and thus can pivot whereby the leg 111 and its forks 70 and 71 can push downwardly on the gimbal extensions 72 and 73 to move the rollers 40 and 42 downwardly and, of course, all of this exerts the desired type of restrictive or tractive force on the balls. The bracket B is pivoted in a spherical socket 115 so that the bracket can swing about point P on the transverse axis W—W in FIGURE 2 on the vertical axis C—C, and about the horizontal axis D—D and, in addition, the pivot P moves in certain instances along the axis E—E which passes through the center of a line joining the two ball centers. Since the control rollers are not called upon to support the balls against an inward urging, the force exerted by the control rollers against the balls may be proportioned relative to the other ball contacts for optimum results by proper proportioning of the vertical and horizontal legs of bracket B relative to pivot point P. This results in a force for a given output torque which is sufficient to prevent slippage, yet not excessive to the point of causing undue wear.

Also, the bracket moves along E—E axis by considering the following. In its area 112 there is a socket 115 which receives the spherical head 120 of an elongated pin 121. This pin is threaded within a hollow tube 122 and may be manually adjusted to move upwardly or downwardly. The tube has adjacent its base on the exterior thereof an annular flange 123 extending integrally therefrom for receiving one end of a spring 124 which is biased between a plate 125 interposed between flange 123 and the screw 126 which is secured into the housing H. Secured to the tube 122 by means of set screw 127 is a cap 128 having integral therewith one end of a spring 129, the convolutions of which surround pin 121 and the other end of spring 129 is integral with the pin 121. Thus the pin may be manually moved inwardly and assume this is done after assembly and under conditions of no output torque at shaft 12. As the pin is moved inwardly, the bracket is moved vertically downward and axially to the left and this downward movement causes the top control rollers to contact the balls, moving the balls downward to contact the botom control rollers. The axial movement of the bracket to the left takes up any play that may exist between the axially disposed parts and in addition, this axial take-up action will cause the cams 23 and 30 to rotate with respect to each other until the balls 22 lie in the bottoms of the V-shaped recesses in cams 23 and 30. Thus, this one screw takes up all play in the complete system including all ball contact, radial and thrust bearings. The torque required at pin 121 to take up the system play is small under conditions of no output torque above.

As pointed out, in order for the control rollers 40 to 43 to control the axes of rotation of the balls 10 and 11, these rollers must exert a restricting tractive force on the balls in the direction parallel to their axes. Such force is derived by the bracket B exerting a vertical force through its legs 70 and 71 on the pivoted members 72 and 73, the latter in turn exerting force on the upper rollers 40 and 42. Since the vertical leg of bracket B is connected to thrust bearing 24, the force exerted by the control rollers against the balls, as well as the force exerted by cups 6 and 8 against the balls, is proportional to the output torque. When the output torque is increased beyond the rated output torque, the bracket B exerts sufficient force on pin 121 to compress spring 124 beyond its biased position and lift the plunger 122, which movement is readily usable for control functions since it signals an overload condition. Screw 126 is adjustable and permits the maximum transmissable torque to be set at any desired value. By modifying stops 35 and 36 and adjusting spring 124 for zero bias, the movement of plunger 122 is directly proportional to output torque and this movement is then usable to measure output torque continuously for external indicating, recording or controlling functions. Torsional spring 129 functions to automatically take up all play that may exist or develop in the system.

As explained, the bracket B is pivoted in socket P so that the bracket can swing about P on axes D—D, C—C, W—W and in addition the pivot P may move along axis E—E. The purpose of all this is as follows: The pivoting of bracket B about the transverse axis W—W provides the main function of the bracket, namely to transfer the gross developed axial thrust to the control rollers so that control rollers force as well as force of surfaces 7 and 9 is proportional to output torque. Actually bracket B pivoting about the vertical axis C—C is not desired once the unit is assembled and is prevented from doing so by arms 70 and 71 on the bracket bearing against the gimbal mounts 72 and 73. Bracket B pivoting about the horizontal axis D—D provides equalization of forces between the two ball control roller sets which is desirable in order to help get balanced power transmission capability through the two balls.

The overall function of parts designated at 124, 125, 126, 128, 122, 121, 127 is essentially threefold: First to provide a means, accessible from the outside, to initially set the play in the complete system to zero and to maintain zero play even though wear may develop, and to do this without exerting an initially high loading force at the ball contact surfaces 7 and 9. This is accomplished as follows:

(a) Take-up pin 121 having a spherical end 120 bearing in the socket of bracket B can be screwed in or out along axis E—E. Assume now that this is done manually after assembly and under conditions of no output torque at shaft 12. As pin 121 is moved inward the bracket B is moved vertically downward and axially to the left. The downward movement causes as a result of the pivoting movement of forks 70 and 71 the top control rollers 40 and 42 to pivot arcuately and thus contact the balls 10 and 11, moving the balls downward to contact the bottom control rollers 41 and 43. The axial movement of the bracket to the left takes up any play that may exist between the various parts, namely, bracket B, thrust bearing 24, cam 23, balls 32, slip cam 30, slip ring 26, output cone 8, balls 10 and 11, input cone 7 and input hub 5. In addition this axial take-up action will cause cams 23 and 30 to rotate with respect to each other until the balls 32 lie in the bottoms of the mating V-shaped recesses of said cams. Thus this one screw 121 takes up all play in the complete system.

(b) The torque required at pin 121 to take up the system play is small under conditions of no output torque above. Take-up spring 129 which is of the torsional type is attached at one end to pin 121 and to take-up cap 128 at the other end. Once pin 121 has been rotated initially to take up the system play, take-up cap 128 is rotated to cause a small torsional effect on pin 121 henceforth automatically taking up any play that may develop. Set screw 127 locks the setting of this torsion adjustment.

(c) The action of spring 129 is to take up play without exerting a high system force, per (b) above. When output torque is applied to shaft 12 the forces in the system increase proportional to output torque and consequently the force on pin 121 along axis E—E becomes relatively large. But pin 121 is a non-reversible mechanism so that the setting of pin 121 is not changed due to system loading action, and when output torque is again reduced to zero the system force is again reduced to the same small value. The rotational position of pin 121 will tighten up, as it should, if the preceding system load has caused a more thorough seating or wear of the system parts.

(d) The principal merits of this take-up system are: Take-up must be accomplished to insure initial driving contact at all friction contacts on the balls 10 and 11. The system reduces play to zero without introduction of either torsional springiness effect at the output shaft or heavy preloading of the contact surfaces which would cause needless wear. The take-up is automatic during the life of the unit and is simple, considering the function accomplished.

Second, to provide a means accessible from the outside, to adjust the torque at which the overload protection mechanism goes into operation, this being accomplished as follows: The combination of overload screw 126, overload spring 124, and overload plunger 122 is such that the plunger assembly will not move along axis E—E until the force of the bracket B exceeds a certain value determined by the setting of overload screw 126. If now load on output shaft 12 is increased, the action of the cams 23 and 30 and balls 32 increases the system forces as needed to deliver the required output tractive force. This in turn results in a force along axis E—E which is also proportional to output torque. As long as this force does not exceed the force setting mentioned above, then overload spring 124 will not deflect and cams 23 and 30 will not rotate with respect to each other except by a small amount permitted by the springiness of the component parts of the loaded system. These parts are made relatively stiff in order to keep this cam movement low under ordinary conditions of output torque. The result of this is a relatively high effective stiffness of the output shaft 12 for torque loads within the rating of the device and of course this is very desirable in most applications.

If the output torque is increased to overload proportions, then the force of bracket B exerted along axis E—E will exceed the bias force of spring 124 and the whole plunger will lift along axis E—E. When this happens, gross movement of cam 23 with respect to cam 30 will occur and will progress until overload pin 36 strikes the confines of slot 35. Subsequently non-destructive slippage will occur at slip ring 26 and overload protection is achieved.

The principal merits of this overload protection system are, namely, insurance that excessive stresses are not produced in any of the parts when the unit is overloaded; provision for conveniently accessible adjustability of the maximum output torque that the unit is capable of delivering without the necessity of any disassembly; provision for adjustable torque protection to other mechanisms that may be connected to output shaft 12.

Third, provision of a moving member outside the housing which is activated by overload conditions, namely plunger 122, which moves along axis E—E when the drive is overloaded. Clearly, this movement can be correlated with apparatus not shown to automatically turn off the driving motor under overload or to provide a warning signal.

Having thus described the structure and operation of the drive mechanism of this invention, it should be clear that the following characteristics and advantages, in addition to many others, exist:

The drive unit is a true torque and speed converter. For a given output torque the input torque reduces as the output speed is reduced and thus the drive does not lose any power by slippage to obtain reduced speed.

Zero output speed is available without stopping the input shaft without the use of gears, which are costly and a source of noise, or controlled motors that can develop little torque at zero speed since no ventilation is present.

Reverse speeds are provided without stopping and reversing the input which is desirable for any system which actuates a sliding linear mechanism rapidly, such as machine tool feeds. The present unit has the advantage of low inertia of the control and output components in the system, and therefore has inherently high response speed.

Because the control rollers 40 to 43 are simply varied about a point on the balls 10 and 11, the mechanism to control speed requires very little movement, torque and energy, all of which permits great latitude in the accessory control ramifications and is especially desirable when the device is employed as a servomechanism.

The unit has linear speed control which is very desirable from the standpoint of reasonable control dial calibrations and is often desirable wherever the device is used for automated controls or as a servo.

Since all drive components in the system are of circular configuration, there are no salient components such as gears, reciprocating pistons, or cranks which can produce harmonic pulsing effects which show up and are undesirable at very low output speeds or when the unit is used as a positioning device.

All friction contact forces including the control rollers in the drive are proportional to output torque, a desirable feature from the standpoint of creating no more wear than is necessary to deliver the required output torque.

The drive mechanism is provided with a built in overload protection which minimizes damage to the unit by misapplication.

The mechanism has the same speed-torque and speed control characteristic for both directions of torque, for all speed settings, reverse included, and this is essential if the desired deceleration rate of the load is higher than the coast-down rate, or if for any reason the load attempts to over drive the unit and for high speed positioning applications in order to accommodate inertia within the load.

Speed settings can be changed with zero input speed and this is important wherever a speed is to be predetermined to prevent start-up speed errors in numerous applications. As an incidental in this connection, whenever the speed control shaft is changed between the time of shut-down and start-up of the input shaft, new areas (circles) on the balls are presented to the contact surfaces so that wear is distributed in time over the whole surface of the balls 10 and 11.

Shafts on the unit are in alignment which is highly desirable in most equipment designs, in order to save space. The projected outline of this unit is smaller than motors with which it would be used, another desirable space saving feature. This is true also of the electric and hydraulic types if the space required for control and oil cooling is ignored.

Probably the greatest single merit is its extremely wide speed range. The mechanical drive provides zero output speed capable of delivering full motor speed and higher as well in either direction. Furthermore, the speed range is located in the most commonly needed range, namely, between motor speed and zero speed.

Throughout, a typical and preferred embodiment has been shown and described. However, numerous modifications are intended to be covered. For example, the figures depict the use of a pair of balls 10 and 11 and there must be at least two, but with the common central support roller 13 there could be employed any greater number of power transmitting balls. The illustrated angle of each conical surface 7 and 9 is about 45 degrees but this angle may be varied considerably uniformly or separately, the only limitation being that it must be such as to have a containing function on the balls 10 and 11. The surface 14 preferably is conical as such (1) insures its rotation at all output speed settings between plus and minus the input speed and (2) an additional percentage component of force is thrown onto the input cone for all values of output torque and output cone force, but this surface 14 may assume other configurations. The means for controlling and adjusting the control rollers 40 to 43 is preferred for its simplicity in obtaining symmetry and linearity between shaft 80's angle of rotation and output speed for a given input speed. To accomplish this in the embodiment shown there must be: namely, means to maintain the axes of each pair of upper and lower control rollers parallel; means to cause right and left sets of control roller axes to move through equal but opposite angles; means to cause the axes of the control rollers to vary in accordance with the arc tangent of the angle of the speed control shaft 80.

It is believed that the use of pins on control plates 84 and 96 and radical slots in levers 98 and 99, together with means for converting rotational motion of control shaft 80 to linear motion of control plates 84 and 96 is unique in accomplishing the above. However, instead of plates 96 and 84 including the particular movement thereof, the levers and the general linkage arrangements shown, other means could be employed. For example, the plates could be caused to move axially rather than transversely and capstan and wire means could function as the converting apparatus. The unit will function even if the rollers 40 to 43 are gimbaled on axes which are neither coincident, parallel, nor even pointed to the center of the balls 10 and 11. The only requirement for the control of the axis of rotation of the balls is that the projection of top and bottom control roller axis onto an axial plane at the center of the balls must be substantially common lines.

The principal function of the rollers 40 to 43 is to vary the axis of rotation of the balls 10 and 11 and they maintain the axes of rotation of the balls at set angles by virtue of the fact that they permit the balls to rotate only on a horizontal axis which is parallel to the control roller axes. Another function of the rollers is to resist free rotation of the balls 10 and 11 due to applied output torque or in other words without rollers 40 to 43 no output torque would be delivered. Since the central axes of the gimbal mounts pass through the respective points of contact with balls 10 and 11, there is no caster effect and thus the said axial thrust due to output torque does not urge the gimbals to rotate in either direction, tending to increase or decrease speed setting. This would not be so in the event positive or negative caster is incorporated in the gimbals in order to obtain specialized torque-speed characteristics of the output shaft.

It is believed the foregoing detailed description substantiates the outlined objects and advantages of this invention, but it is to be understood that the scope thereof is to be construed and interpreted in light of the following claims.

What is claimed is:

1. A drive mechanism comprising a driving means, a driven means, a pair of spherical balls, and a common support roller for the balls, said balls being disposed about a central axis and disposed in contacting relationship with said driving means, said driven means and said common support roller for transmitting motion from the driving means to the driven means, and means including control rollers contacting each ball for controlling the axes of rotation of the balls.

2. A drive mechanism as defined in claim 1 wherein there is an input shaft keyed to said driving means and an output shaft connected to said driven means, said surfaces being annular about their axes of rotation.

3. A drive mechanism as defined in claim 2 wherein means is interposed between the output shaft and said driven means to provide axial force for obtaining tractive force between the balls and said driving and driven means.

4. A drive mechanism as defined in claim 3 wherein said interposed means includes an overload protection mechanism operative upon output torque increasing toward overload proportions.

5. A drive mechanism as defined in claim 3 wherein said interposed means includes a viscous slip member operative upon transmission of torque.

6. A drive mechanism as defined in claim 1 wherein said driving and driven means are annular members and of conical configuration and in axial alignment but in spaced relationship to accommodate said balls therebetween.

7. A drive mechanism as defined in claim 6 wherein said support roller is located between the balls and journaled for free rotation and includes a conical surface in contact with said balls.

8. A drive mechanism as defined in claim 6 wherein the means for controlling the axis of rotation of said balls comprises a pair of control rollers consisting of an upper and lower roller for each ball, said control rollers being supported in journaled relationship.

9. A drive mechanism as defined in claim 8 wherein means is provided for adjusting the axes of said control rollers, the roller axes of each pair throughout their adjustment remaining parallel with the axes of both upper rollers varying conjugately during adjustment with respect to each other and the axes of both lower rollers varying conjugately with respect to each other during adjustment.

10. A drive mechanism as defined in claim 9 wherein the means for adjusting the control roller axes includes a control shaft connected through linkage with said control rollers.

11. A drive mechanism as defined in calim 6 wherein the control rollers are capable of exerting during torque transmission a restricting tractive force on said balls in a direction parallel to their axes, and means for maintaining said restricting tractive force.

12. A variable speed mechanism as defined in claim 11 wherein each pair of rollers consists of an upper and lower roller, the upper rollers being journaled on movable members, said last named means including a bracket having portions exerting a downward force on said members and in turn said upper control rollers.

13. A variable speed mechanism as defined in claim 12 wherein said bracket is pivotally mounted and there is provided means to adjust the pivot of said bracket.

14. In a drive apparatus including a frame and input and output shafts journaled in said frame, a driving disk having an annular surface keyed to said input shaft, a driven disk having an annular surface connected in driving relationship with said output shaft, a pair of spherical balls and a common support roller between the balls journaled on said frame, said balls being disposed about a central axis and disposed in contacting relationship with said surfaces and common support roller for transmitting motion from the input shaft to the output shaft, and control roller means contacting each ball for controlling the axes of rotation of the balls.

15. A drive mechanism as defined in claim 14 wherein the surfaces of said disks are mating and in axial alignment but in spaced relationship to accommodate the balls therebetween.

16. A drive mechanism as defined in claim 14 wherein the control roller means includes an upper and lower roller for each ball, all rollers being supported on said frame in journaled relationship and means for adjusting the axes of said control rollers.

17. A drive mechanism as defined in claim 16 wherein the roller axes of the pair associated with each ball remains parallel throughout adjustment with the axes of both upper rollers varying conjugately during adjustment with respect to each other and the axes of both lower rollers varying conjugately with respect to each other during adjustment.

18. A drive mechanism as defined in claim 16 wherein the means for adjusting the control roller axes includes a control shaft journaled in said frame, plates associated with the upper and lower control rollers and movable transversely relative to said frame upon rotation of said control shaft and linkage connecting each plate with the rollers.

19. A drive mechanism as defined in claim 17 wherein the control rollers are capable of exerting during torque transmission a restricting tractive force on said balls in a direction parallel to their axes, and means for maintaining said restricting tractive force.

20. A drive mechanism as defined in claim 19 wherein the upper pair of said control rollers are journaled on movable members connected to said frame, said last named means including a bracket having portions exerting a downward force on said members and in turn said upper control rollers.

References Cited in the file of this patent

UNITED STATES PATENTS

| | | |
|---|---|---|
| 1,850,189 | Weiss | Mar. 22, 1932 |
| 2,100,629 | Chilton | Mar. 30, 1937 |
| 2,727,396 | Haugwitz | Dec. 20, 1955 |
| 2,931,234 | Hayward | Apr. 5, 1960 |